(12) United States Patent
Yamada et al.

(10) Patent No.: US 8,680,801 B2
(45) Date of Patent: Mar. 25, 2014

(54) ROTATING ELECTRICAL MACHINE SYSTEM

(75) Inventors: Eiji Yamada, Owariasahi (JP); Kenji Hiramoto, Owariasahi (JP); Hideo Nakai, Nisshin (JP); Norimoto Minoshima, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 29 days.

(21) Appl. No.: 13/428,265

(22) Filed: Mar. 23, 2012

(65) Prior Publication Data

US 2012/0242272 A1  Sep. 27, 2012

(30) Foreign Application Priority Data

Mar. 23, 2011 (JP) .................... 2011-065003

(51) Int. Cl.
*G05B 5/00* (2006.01)
(52) U.S. Cl.
USPC . 318/473; 318/811; 318/400.02; 318/400.07; 318/400.26
(58) Field of Classification Search
USPC ........... 318/811, 473, 400.02, 400.07, 400.26
See application file for complete search history.

(56) References Cited

U.S. PATENT DOCUMENTS

| | | | |
|---|---|---|---|
| 7,358,698 B2 | 4/2008 | Seguchi et al. | |
| 8,013,565 B2 * | 9/2011 | Miura | 318/811 |
| 8,421,391 B2 * | 4/2013 | Yeh et al. | 318/432 |
| 2008/0054835 A1 * | 3/2008 | Tamaru | 318/634 |
| 2010/0259136 A1 | 10/2010 | Hiramoto et al. | |

FOREIGN PATENT DOCUMENTS

| | | |
|---|---|---|
| JP | 2007-185082 A | 7/2007 |
| JP | 2008545363 A | 12/2008 |
| JP | 2009-112091 A | 5/2009 |
| JP | 2010-098908 A | 4/2010 |
| JP | 2010-110079 A | 5/2010 |
| JP | 2011015515 A | 1/2011 |
| JP | 2012-170256 A | 9/2012 |
| WO | 2007003868 A1 | 1/2007 |
| WO | 2012110879 A2 | 8/2012 |

OTHER PUBLICATIONS

Bimal K. Bose, Modern Power Electronics and AC Drives, 2005, Prentice-Hall of India, pp. 74, 75, 86, 87.*
Dr. Glab V. Tcheslavski, Synchronous Machines, Spring 2008, Lamar University, pp. 76-78.*

* cited by examiner

*Primary Examiner* — Eduardo Colon Santana
*Assistant Examiner* — Bickey Dhakal
(74) *Attorney, Agent, or Firm* — Gifford, Krass, Sprinkle, Anderson & Citkowski, P.C.

(57) ABSTRACT

A rotating electrical machine system includes a stator that has stator windings of a plurality of phases, and that generates a stator magnetomotive force in accordance with stator current of different phases, which is supplied to the stator windings of the plurality of phases; a rotor on which rotor windings are wound such that rotor current is generated in accordance with the stator magnetomotive force generated by the stator and a magnetic pole is formed by the rotor current; and a control unit that controls an output torque from the rotor, by controlling the stator current. In a case where a predetermined torque is output from the rotor, the control unit applies a pulse to the stator current so as to increase the stator current and reduce the rotor current, when a temperature of the rotor is high as compared with when the temperature of the rotor is low.

1 Claim, 10 Drawing Sheets

ROTATING ELECTRICAL MACHINE SYSTEM

CROSS REFERENCE TO RELATED APPLICATIONS

This application claims priority to Japanese Patent Application No. 2011-065003 filed on Mar. 23, 2011, which is incorporated herein by reference in its entirety including the specification, drawings and abstract.

BACKGROUND OF THE INVENTION

1. Field of the Invention

The invention relates to a rotating electrical machine system which includes a stator having stator windings and a rotor having rotor windings, and in which the rotor is caused to rotate through control of stator current.

2. Description of Related Art

As disclosed in Japanese Patent Application Publication No. 2009-112091 (JP-A-2009-112091), there is known a rotating electrical machine in which rotor windings are provided in a rotor, and a rotating magnetic field that is generated by a stator, and that includes a spatial harmonic, gives rise to induction current in the rotor windings, and to rotor rotation torque, whereby the rotor is caused to rotate.

The rotating electrical machine requires no magnets. An efficient rotating electrical machine can be thus obtained that is comparatively inexpensive.

Other related art documents than the above Application Publication that relate to the invention include, for instance, Japanese Patent Application Publication No. 2007-185082 (JP-A-2007-185082), Japanese Patent Application Publication No. 2010-98908 (JP-A-2010-98908) and Japanese Patent Application Publication No. 2010-110079 (JP-A-2010-110079).

The temperature in the rotating electrical machine may rise depending on the operational state thereof. Such rises in temperature must be curbed.

SUMMARY OF THE INVENTION

A first aspect of the invention relates to a rotating electrical machine system that includes: a stator that has stator windings of a plurality of phases, and that generates a stator magnetomotive force in accordance with stator current of different phases, which is supplied to the stator windings of the plurality of phases; a rotor on which rotor windings are wound such that rotor current is generated in accordance with the stator magnetomotive force generated by the stator and a magnetic pole is formed by the rotor current; and a control unit that controls an output torque from the rotor, by controlling the stator current. In a case where a predetermined torque is output from the rotor, the control unit applies a pulse to the stator current so as to increase the stator current and reduce the rotor current, when a temperature of the rotor is high as compared with when the temperature of the rotor is low.

A second aspect of the invention relates to a rotating electrical machine system that includes: a stator that has stator windings of a plurality of phases, and that generates a stator magnetomotive force in accordance with stator current of different phases, which is supplied to the stator windings of the plurality of phases; a rotor on which rotor windings are wound such that rotor current is generated in accordance with the stator magnetomotive force generated by the stator, and a magnetic pole is formed by the rotor current; and a control unit that controls an output torque form the rotor, by controlling the stator current. In a case where a predetermined torque is output from the rotor, the control unit applies a pulse to the stator current so as to increase the rotor current and reduce the stator current, when a temperature of the stator is high as compared with when the temperature of the stator is low.

According to the abovementioned aspects of the invention, a ratio between the stator current and the rotor current can be adjusted by superposing a pulse onto stator current. Therefore, rotor or stator current can be reduced to lower the temperature of the rotor or the stator, in a case where a predetermined torque is output.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention are explained below with reference to accompanying drawings.

Figure 1:
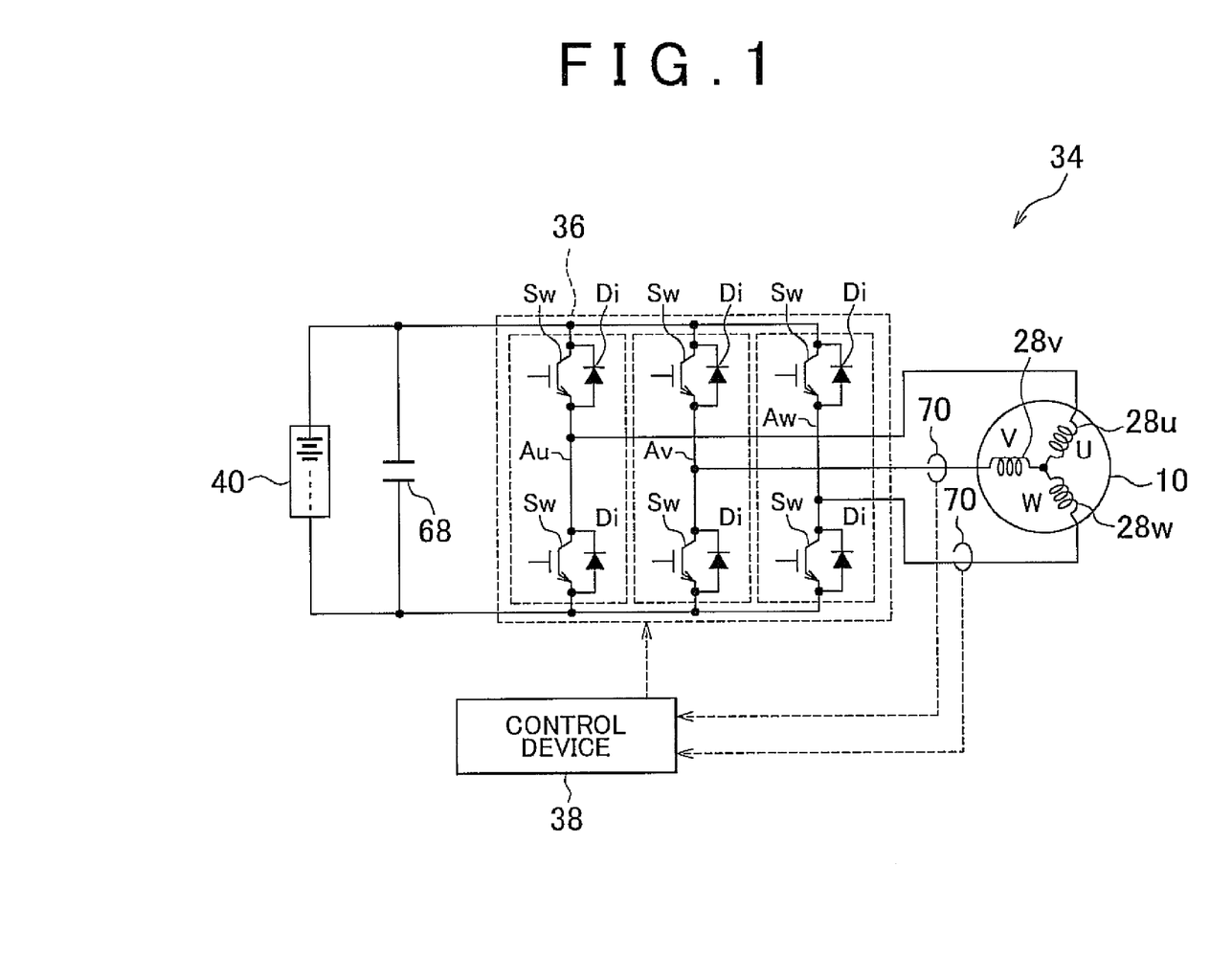
FIG. 1 is a diagram illustrating a schematic configuration of a rotating electrical machine system according to an embodiment of the invention.

FIG. 1 is a diagram illustrating the entire configuration of a rotating electrical machine system according to an embodiment. A rotating electrical machine system 34 includes a rotating electrical machine 10 that functions as an electric motor or generator; an inverter 36 that controls driving current to the rotating electrical machine 10; a control device 38 that controls switching of the inverter 36; and an electrical storage device 40. The rotating electrical machine 10 is also referred to as a motor or motor-generator.

Such a rotating electrical machine system 34 is installed for instance in vehicles, as a driving power generator for vehicles. Examples of the vehicle include hybrid vehicles in which an engine and a motor for traveling are used as drive sources, as well as fuel cell vehicles, and electric vehicles.

The electrical storage device 40 is ordinarily constituted by a secondary battery that can be charged and discharged, for instance a lithium ion battery, or a nickel hydride battery. The output voltage of the electrical storage device 40 ranges for instance from about 300 to 500 V. The output of the electrical storage device 40 is supplied to the inverter 36. Herein, power may be supplied to the inverter 36 through boosting of voltage in the electrical storage device 40, by arranging a DC/DC converter between the electrical storage device 40 and the inverter 36. In this case, the input voltage of the inverter 36 may be changed in accordance with the output torque of the rotating electrical machine 10

The positive electrode and negative electrode of the electrical storage device 40 are connected to a positive electrode bus and a negative electrode bus of the inverter 36. A capacitor 68 is connected between the positive electrode bus and the negative electrode bus, to stabilize thereby the voltage (inverter input voltage) between the positive electrode bus and the negative electrode bus.

The inverter 36 includes three phase arms Au, Av, Aw of a U-phase, a V-phase and a W-phase. Each of the phase arms Au, Av, Aw has a configuration in which two switching elements Sw are connected in series. Ordinarily, a power transistor such as an insulated gate bipolar transistor (IGBT) or the like is used as the switching element Sw. To each switching element Sw there is connected in parallel a diode Di for causing current to flow in a direction opposite to the direction of current that is caused to flow by the switching element Sw. The midpoints of the arms Au, Av, Aw are connected to one end side of stator windings 28u, 28v, 28w of the respective phases in the rotating electrical machine 10. In the stator windings 28u, 28v, 28w, same-phase stator windings are connected to each other in series, while the other ends of the stator windings 28u, 28v, 28w of different phases are connected to a common point that constitutes a neutral point.

The control device 38 calculates a target torque of the rotating electrical machine 10 in accordance with an output torque command signal that is inputted from, for instance, an accelerator pedal sensor (not shown) or the like in a vehicle, and controls the switching operation of each switching element Sw in such a manner that the output torque of the rotating electrical machine 10 matches a target torque.

To this end, the control device 38 receives a signal that indicates a current value detected by a current sensor 70 provided on the side of the stator windings of at least two phases (for instance, 28v, 28w) from among the three phases, and a signal that indicates the position (rotation angle θ of a rotor 14 of the rotating electrical machine 10 as detected by a rotation angle detection unit 82 (FIG. 4) such as a resolver or the like. The control device 38 controls switching on-off of the switching elements Sw in accordance with the rotation angle θ of the rotor 14, to control thereby the phase of the current in the stator windings 28u, 28v, or 28w of each phase, and performs pulse width modulation (PWM) control of the switching elements Sw, to control thereby the amplitude of the current that flows in the stator windings 28u, 28v, or 28w of each phase, and control as a result the output torque of the rotating electrical machine 10.

The control device 38 includes a microcomputer having a central processing unit (CPU), a memory and the like, and may be made up of a plurality of control devices that are provided for respective functions.

The control device 38 converts direct current power from the electrical storage device 40 to alternate current power of three phases, namely u-phase, v-phase and w-phase, through switching of the switching elements Sw that make up the inverter 36, and supplies the converted power to the stator windings 28u, 28v, 28w of the respective phases. Therefore, output torque of the rotor 14 (FIG. 2) can be controlled by controlling the phase (current advance angle) and amplitude of the AC current that flows in the stator windings 28u, 28v, 28w.

Configuration of the Rotating Electrical Machine

Figure 2:
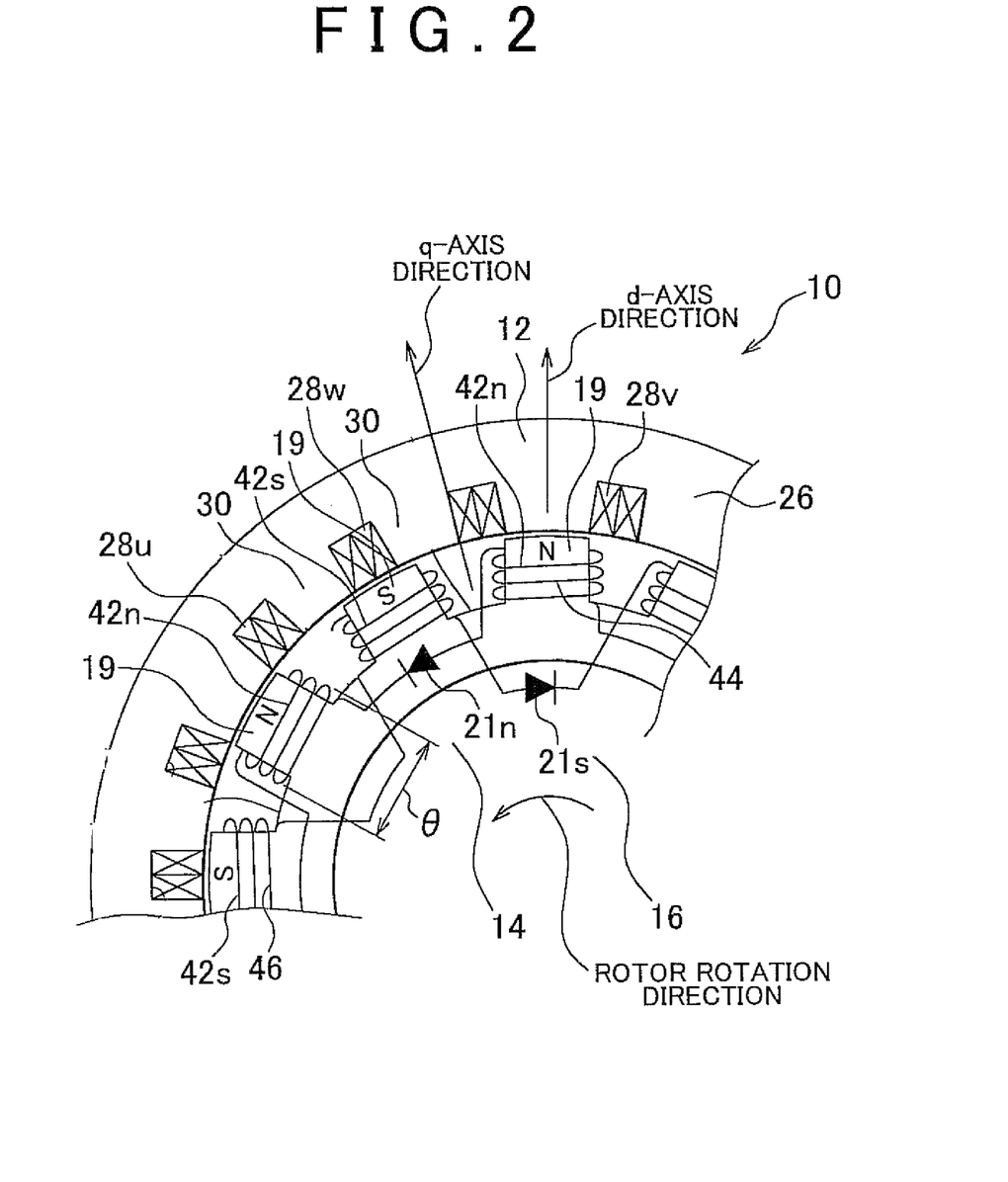
FIG. 2 is a schematic diagram illustrating part of opposing portions of a stator and a rotor in the embodiment of the invention.

FIG. 2 illustrates the configuration of the rotating electrical machine 10. The rotating electrical machine 10 includes a stator 12 and the rotor 14 that are disposed concentrically and opposing each other in a radial direction. The rotor 14 is disposed inward of the stator 12.

In the stator 12, a plurality of teeth 30 that point in a central direction are provided, at a plurality of sites in a peripheral direction, in a circular stator core 26. That is, the teeth 30 are provided at predetermined spacings, in the peripheral direction, at the stator core 26, such that the stator windings 28u, 28v, 28w are wound, in a concentrated-wiring manner, on the teeth 30.

Salient poles 19 that protrude outwards in the radial direction are provided, in the rotor 14, at a plurality of sites in the peripheral direction of a circular rotor core 16, such that a first rotor winding circuit 44 is made up of a plurality of first rotor windings 42n that are wound at a first set of salient poles 19, at every other site in the peripheral direction. Also, a plurality of second rotor windings 42s that are wound on a second set of salient poles 19 make up a second rotor winding circuit 46. Each salient pole 19 in the second set is adjacent to the salient pole 19 in the first set. One diode 21n is disposed in the first rotor winding circuit 44, and one diode 21s is disposed in the second rotor winding circuit 46, so that the current directions in the first rotor winding circuit 44 and the second rotor winding circuit 46 are determined by the diodes. In terms of regulating current direction, such a configuration is identical to connecting one diode 21n to the first rotor windings 42n wound on the salient poles 19 and connecting one diode 21s to the second rotor windings 42s wound on the salient poles 19.

Current in one direction flows in the rotor windings 42n and current in one direction flows in the rotor windings 42s, on account of induced electromotive force that derives from the rotating magnetic field including a spatial harmonic that is generated by the stator 12, so that the directions of the current that flows in the rotor windings 42n, 42s that are adjacent in the peripheral direction of the rotor 14 are alternately different, and the polarities of adjacent salient poles 19 are inverted. In the state illustrated in the figure, N poles are formed at the leading ends of the salient poles 19 of the first rotor winding circuit 44, while S poles are formed at the leading ends of the salient poles 19 of the second rotor winding circuit 46.

Herein, the sum of the widths w (the width w is the diameter of a circle centered on the center of the rotor winding 42) of the rotor windings 42n, 42s in the peripheral direction of the rotor 14 (i.e. w×number p of salient poles 19) is set to be shorter than a width (π×r (radius)) corresponding to 180° of the electrical angle of the rotor 14, such that the rotor windings 42n, 42s are wound, in a short pitch winding manner, on respective salient poles 19. More preferably, the sum w×p of widths of the rotor windings 42n, 42s in the peripheral direction of the rotor 14 is identical, or substantially identical, to a width (π×r/2) corresponding to 90° of the electrical angle of the rotor 14.

Figure 3:
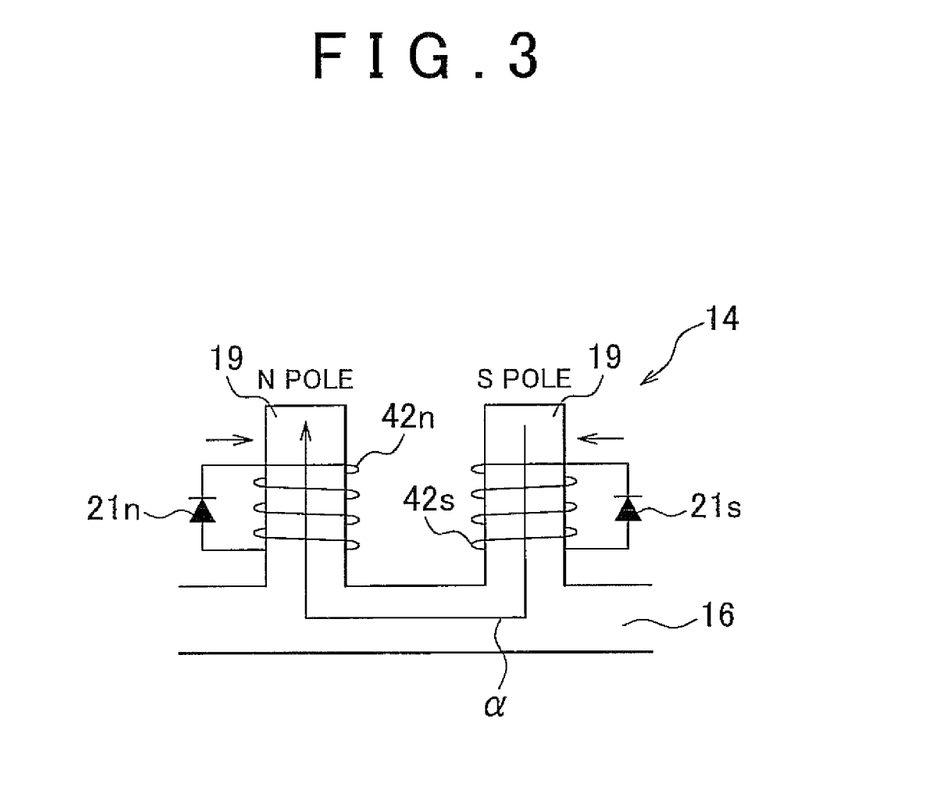
FIG. 3 is a schematic diagram illustrating the way in which magnetic flux flows in the rotor in the embodiment of the invention.

When two adjacent salient poles 19 in the rotor 14 are taken into account, induction current the direction of which is regulated by the diodes 21n, 21s flows in the rotor windings 42n, 42s that are wound on the two salient poles 19, as illustrated schematically in FIG. 3. Magnetic flux flows as indicated by arrow α in FIG. 3, and the adjacent salient poles 19 are magnetized as mutually different magnetic poles. The direction of current flow is determined by the diodes 21n, 21s, and hence each salient pole 19 is magnetized as a magnetic pole having the same polarity at all times.

Configuration of the Control Device

Figure 4:
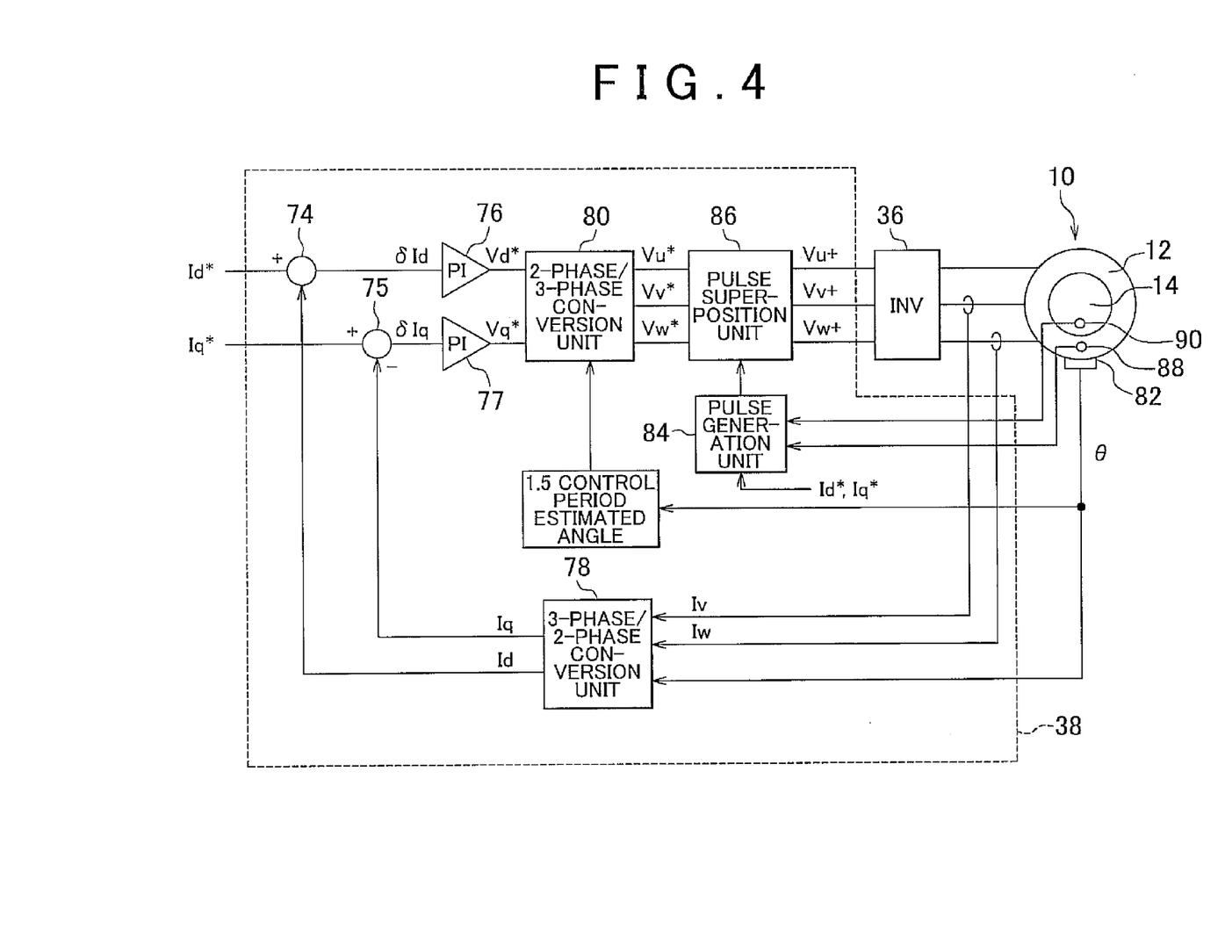
FIG. 4 is a block diagram illustrating the configuration of a control device in the embodiment of the invention.

FIG. 4 is a diagram illustrating the configuration of an inverter control unit in the control device 38. The control device 38 includes a current command calculation unit (not shown); a pulse generation unit 84; a pulse superposition unit 86; subtractors 74, 75; PI operation units 76, 77; a 3-phase/2-phase conversion unit 78; a 2-phase/3-phase conversion unit 80; a PWM signal generation unit, not shown; and a gate circuit. The rotating electrical machine 10 is provided with a rotation angle detection unit 82 that detects a rotor angle θ; a stator thermometer 90; and a rotor thermometer 88. The rotor temperature and the stator temperature may be calculated or estimated through, for instance, integration of the supplied power.

On the basis of a table or the like created beforehand, the current command calculation unit calculates current command values Id*, Iq* corresponding to a d-axis and a q-axis in conventional vector control, in accordance with a torque command value (target torque) for the rotating electrical machine 10, which is calculated in response to an acceleration instruction (an output torque instruction) that is inputted by a user. As illustrated in FIG. 2, the d-axis is the winding center axis direction of the rotor windings 42n, 42s with respect to the peripheral direction of the rotating electrical machine 10, and the q-axis is a direction advanced by 90 degrees of electrical angle with respect to the d-axis.

The 3-phase/2-phase conversion unit 78 calculates a d-axis current value Id, and a q-axis current value Iq, which are currents of two phases, on the basis of the rotation angle θ of the rotating electrical machine 10 as detected by the rotation angle detection unit 82 that is provided in the rotating electrical machine 10, and on the basis of current (for instance, current Iv, Iw of the V-phase and W-phase) of two phases as detected by the current sensor 70.

The current command values Id*, Iq* calculated in the current command calculation unit are supplied to the subtractors 74, 75, and there are obtained deviations δId, δIq with respect to the d-axis current Id and q-axis current Iq from the 3-phase/2-phase conversion unit 78, and the deviations are inputted to the PI operation units 76, 77.

The PI operation units 76, 77 perform a PI operation, by a predetermined gain, on the respectively inputted deviations δId, δIq, and calculate a d-axis voltage command value Vd* and a q-axis voltage command value Vq* for which the measured d-axis current and q-axis current match respective targets.

On the basis of the voltage command values Vd*, Vq* inputted from the PI operation units 76, 77, the 2-phase/3-phase conversion unit 80 performs conversion, to voltage command values Vu*, Vv*, Vw* of three phases, i.e. u-phase, v-phase, w-phase, based on a predicted angle corresponding to a predicted position after 1.5 control periods, as obtained from the rotation angle θ of the rotating electrical machine 10.

The voltage command values Vu*, Vv*, Vw* are inputted to the pulse superposition unit 86. A pulse supplied by the pulse generation unit 84 is superposed thereto, to elicit conversion to a voltage command Vu+, Vv+, or Vw+ value for each phase having a pulse superposed thereto. A pulse is superposed on each command value through addition or subtraction of a numerical value that corresponds to the pulse.

The stator temperature and rotor temperature detected by the stator thermometer 90 and the rotor thermometer 88 are supplied to the pulse generation unit 84. On the basis of the stator temperature and rotor temperature, the pulse generation unit 84 generates a pulse to be superposed onto the stator current of each phase. This feature will be explained later.

The voltage command values Vu+, Vv+, Vw+ are converted to PWM signals with the respective duty ratios, by the PWM signal generation unit not shown. The PWM signals are outputted to the gate circuit not shown. The gate circuit controls on-off switching of the corresponding switching element Sw in accordance with the PWM signal of each phase. Thus, the control device 38 controls the stator windings 28u, 28v, 28w, the inverter 36 is controlled in such a manner that the d-axis current Id and q-axis current Iq of the rotating electrical machine 10 match the current command values Id*, Iq*, and the output torque of the rotating electrical machine 10 is controlled so as to match the target torque.

In FIG. 4, a pulse is superposed onto the voltage command value Vu*, Vv*, or Vw* of each phase, but the pulse may be superposed onto the current command values Id*, Iq*.

Pulse Current Superposition

The output torque of the rotating electrical machine 10 is given by (output torque)=(torque by induction current)+(reluctance torque). This is expressed as follows in equation form.

$$(\text{output torque}) = p_n[(M_{rq}\sin\beta/\sqrt{6N_rN_s})AT_r \cdot AT_s + \{((L_q - L_d)\sin 2\beta)/3N_s^2\}AT_s^2]$$

Herein, $p_n$ is the number of pole pairs (e.g., eight poles forming four pairs), $M_{rq}$ is the mutual inductance, $L_q$, $L_d$ are q-axis and d-axis inductance, respectively, β is the phase (electric advance), and $N_r$, $N_s$ are the number of turns of the rotor winding and the number of turns of the stator winding, respectively.

Also, $AT_r$, $AT_s$ are the rotor magnetomotive force and the stator magnetomotive force, which are divided by the numbers of turns $N_r$, $N_s$, respectively, to yield the rotor current and the stator current. The numbers of turns $N_r$, $N_s$ are learned beforehand, and hence the ratio between the rotor magnetomotive force $AT_r$ and the stator magnetomotive force $AT_s$ is basically identical to the ratio between rotor current and stator current. In the explanation below, therefore, the rotor magnetomotive force and the stator magnetomotive force may be read interchangeably with the rotor current and stator current.

As the two equations above show, the output torque is determined by the rotor magnetomotive force and the stator magnetomotive force.

Figure 5:
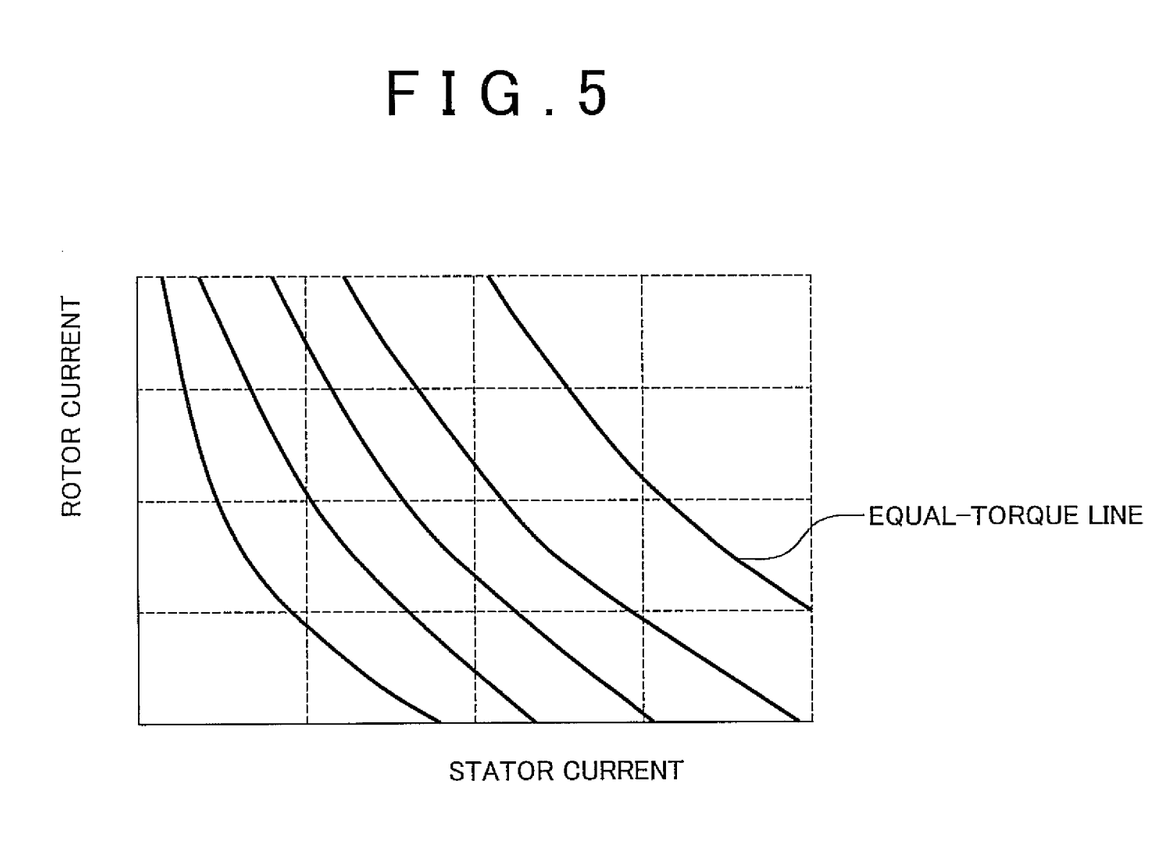
FIG. 5 is a diagram illustrating output torque and loss in accordance with rotor current and stator current.

FIG. 5 illustrates results on a study of the relationship between stator magnetomotive force (stator current), rotor magnetomotive force (rotor current) and output torque. In the figure, the abscissa axis represents the stator magnetomotive force (stator current), and the ordinate axis represents the rotor magnetomotive force (rotor current). The solid lines denote equal-torque lines. Each of the equal-torque lines is a line on which output torque is constant, i.e. a given same output torque is obtained along the line. In the calculation results of this example, the equal-torque line indicated by the lead line in the figure is a line for torque=50 Nm.

Figure 6:
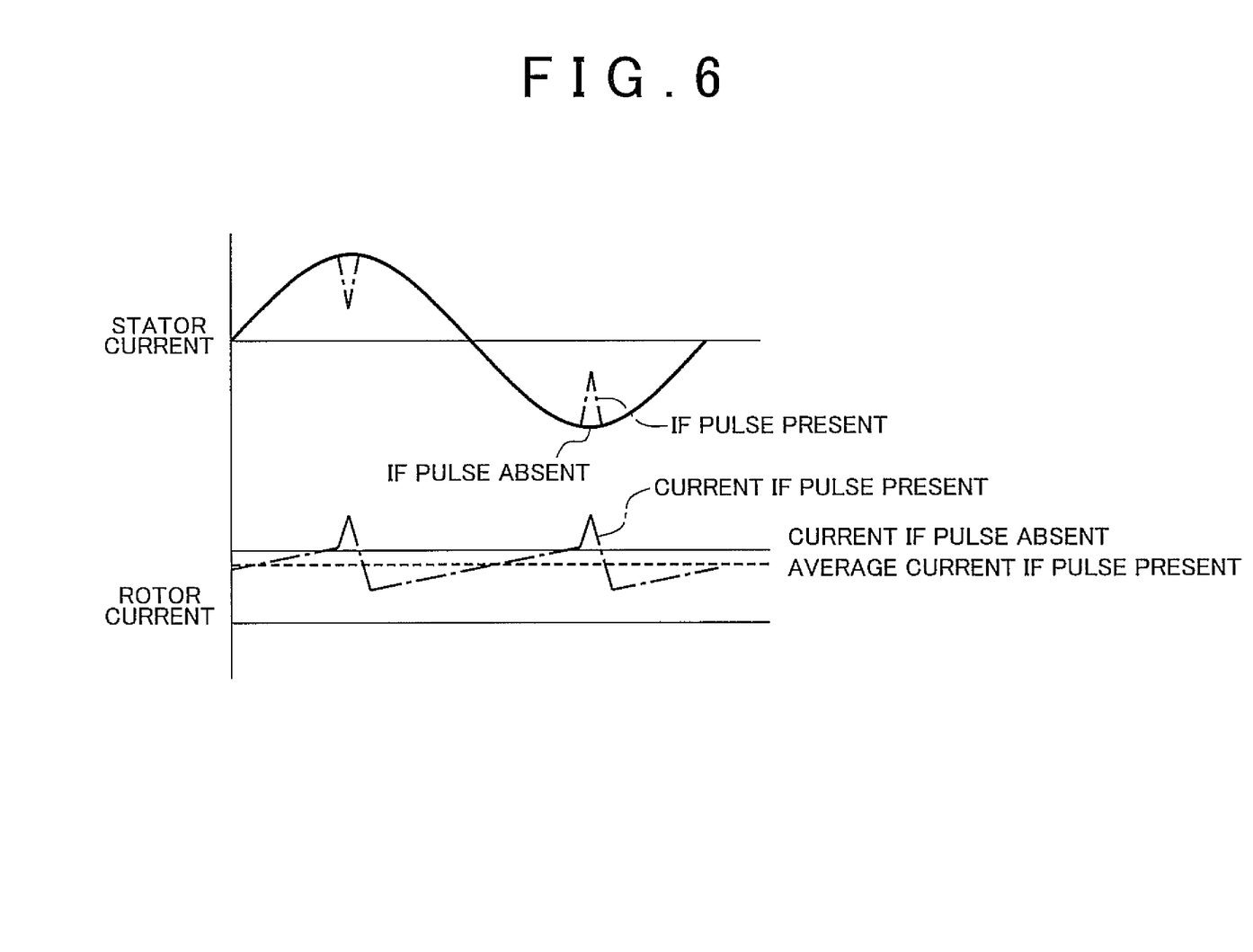
FIG. 6 is a diagram illustrating a relationship between pulse superposition and rotor current.
Figure 7:
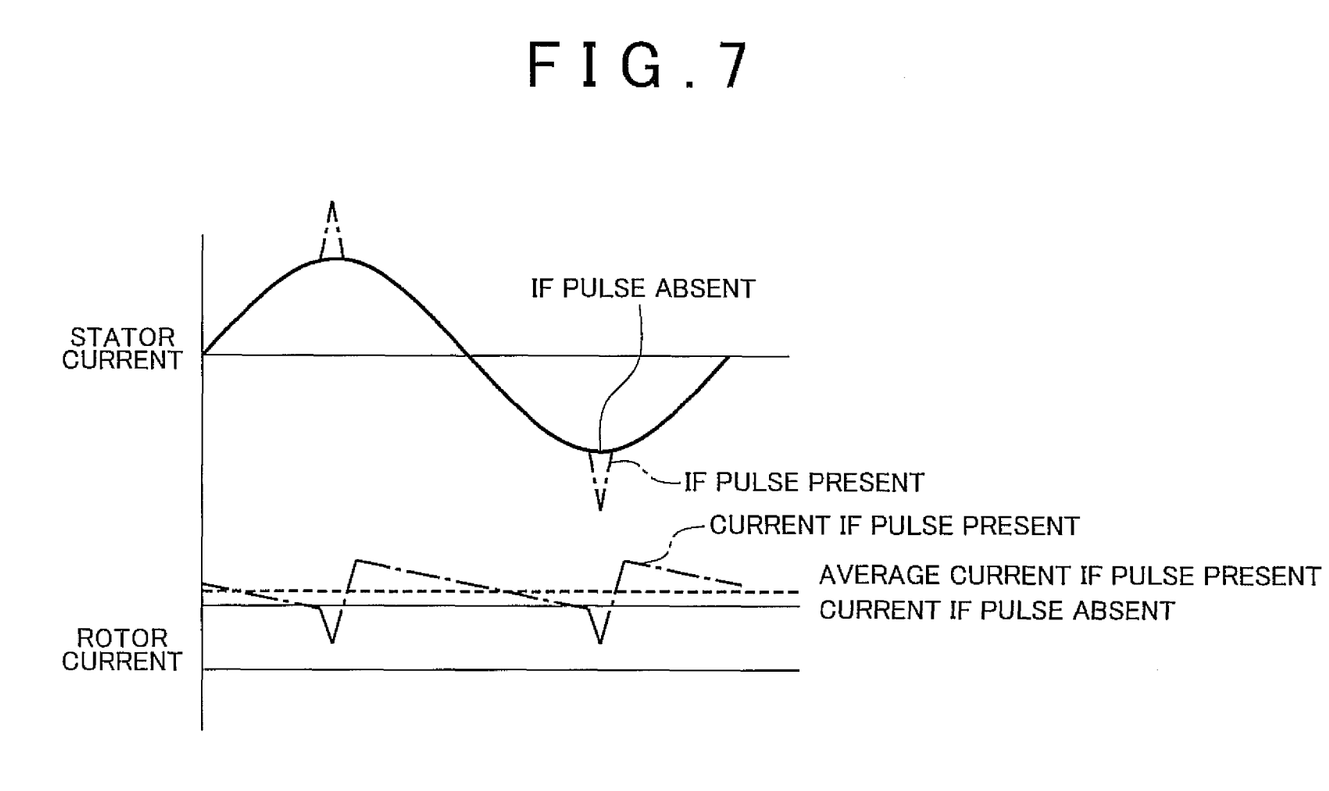
FIG. 7 is a diagram illustrating a relationship between pulse superposition and rotor current.

FIGS. 6 and 7 illustrate the state of stator current and rotor current of one phase. In a case where no pulse is superposed onto the stator current, the rotor current flows in the form of constant current, as indicated by the solid line at the bottom diagram, under the influence of a magnetic field that responds to changes in the sinusoidal stator current. When a pulse is applied to the stator current, however, the magnetic flux that is linked to the rotor windings varies significantly in response to the change in the stator current elicited by the pulse, such that the rotor current flows in accordance with the change in magnetic flux.

In the example of FIG. 6, a pulse in which current is reduced and then increased is superposed onto the stator current. In this example, there is superposed a pulse having a dip at each of electrical angles of 90 degrees and 270 degrees at which the amplitude is maximum. As a result, the rotor current increases in response to the reduction in magnetic flux that accompanies the sharp drop in stator current; thereafter, the rotor current decreases significantly in response to the sharp increase in stator current, and returns thereafter to rotor current in which there is no pulse. The sharpest change elicited by the pulse is the change of the magnetic flux, which reduces the rotor current. The rotor average current is reduced through superposition of the pulse.

This timing is a timing at which the polarity of the other two phases is reversed and there flow respective currents having a ½ magnitude. Therefore, this allows preventing the currents of the respective phases from becoming unbalanced. In a case where, for instance, a pulse is superposed onto the U-phase current, the V-phase current and W-phase current exhibit reverse polarity, and each of the V-phase current and W-phase current is current with ½ magnitude. The current amounts of the phases can be balanced through pulse superposition at a same timing for all of the U-phase current, the V-phase current, and the W-phase current. Preferably, therefore, a pulse is superposed on currents of all phases. The pulse need not be superposed at each period, and may be superposed once every three periods, or even less frequently, for each phase.

The rotor current can be modified based on the magnitude of the pulse that is superposed, and hence the magnitude of the superposed pulse is suitably decided in accordance with a target. However, the rotor current may be modified through modification of the frequency of pulse superposition. In a particularly preferred instance there are controlled both the magnitude of the pulse that is superposed and the frequency of pulse superposition.

In the example of FIG. 7, the pulse that is superposed onto the stator current exhibits a waveform such that stator current is increased and then decreased. Therefore, the rotor average current is increased through superposition of the pulse. Preferably, the pulse superposition timing is identical to that of FIG. 6.

Herein, stator current varies through pulse superposition, but the stator current itself can be arbitrarily controlled based on PWM control. The rotating electrical machine system is controlled through feedback in accordance with a target torque. Therefore, the stator current is increased if the output torque is smaller than the target torque, and is reduced if the output torque is greater than the target torque. The output torque is kept thereby at the target torque.

The relationship between pulse magnitude and amount of change of rotor current is studied beforehand, including, for instance, operation states such as revolutions, and is stored in a map or the like, so that appropriate rotor current control can be performed as a result. The actual rotor current can also be measured by providing an ammeter in the rotor 14, and by extracting the output of the ammeter by way of a slip ring or the like.

In order to obtain constant torque, a corresponding rotor magnetomotive force (rotor current) and a stator magnetomotive force (stator current) are necessary, as described above. In ordinary instances, the ratio between the stator magnetomotive force and the rotor magnetomotive force is determined by the configuration of the rotating electrical machine 10, and hence cannot be modified.

In the embodiment, however, pulse superposition allows eliciting changes in rotor current that are greater than changes in stator current, so that rotor current can be controlled arbitrarily.

In the embodiment, specifically, pulse superposition is the means that is used for modifying the ratio between stator magnetomotive force (stator current) and rotor magnetomotive force (rotor current).

The stator magnetomotive force and rotor magnetomotive force for obtaining a same torque are set in accordance with the temperatures of the stator 12 and the rotor 14. When the stator temperature reaches a predetermined upper limit value, the rotor current is increased and the stator current is reduced, through pulse superposition, to lower thereby the stator temperature. When the rotor temperature reaches a predetermined upper limit value, the stator current is increased and the rotor current is reduced, through pulse superposition, to lower thereby the rotor temperature. It becomes possible as a result to lower the temperature of one of the stator 12 and the rotor 14, while maintaining the output torque, in a case where there rises the temperature of the one of the stator 12 and the rotor 14. In a case where both of the temperature of the stator 12 and the temperature of the rotor 14 rise, burnout of the rotating electrical machine 10, or the like, is prevented by reducing the output torque, or stopping the operation.

Figure 8:
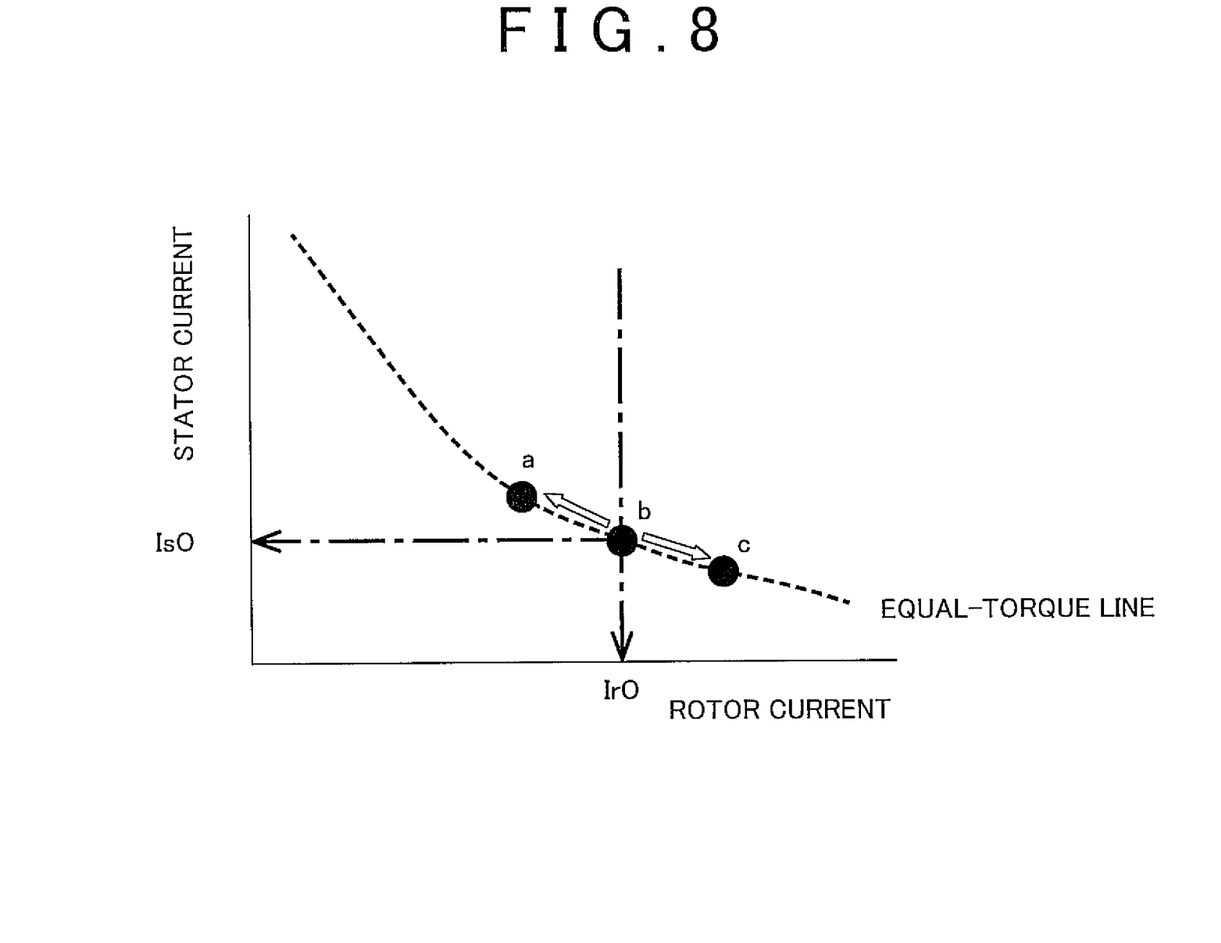
FIG. 8 is a diagram illustrating modification of rotor current and stator current while output torque is maintained.

As illustrated in FIG. 8, the rotor current Ir0 and stator current Is0 when no pulse is superposed correspond to point b. Upon a rise in rotor temperature, the rotor temperature can be lowered through shift to point a at which the rotor current is smaller. When the stator temperature rises upon operation at point b, the stator temperature can be lowered through shift to point c at which the stator current is smaller.

Through pulse superposition, thus, the abovementioned embodiment allows curbing rise in temperature when the stator temperature or rotor temperature rises. If the difference between the stator temperature and the rotor temperature is large, pulses are preferably superposed in such a way as to lower the higher temperature from among the stator and rotor temperatures. A determination value may be set in such a case, such that the above-described control is performed if the above difference exceeds that determination value.

The rotor thermometer 88 may be mounted onto the rotor 14, and a detection signal of the rotor thermometer 88 may be extracted by way of a slip ring or the like.

Figure 9:
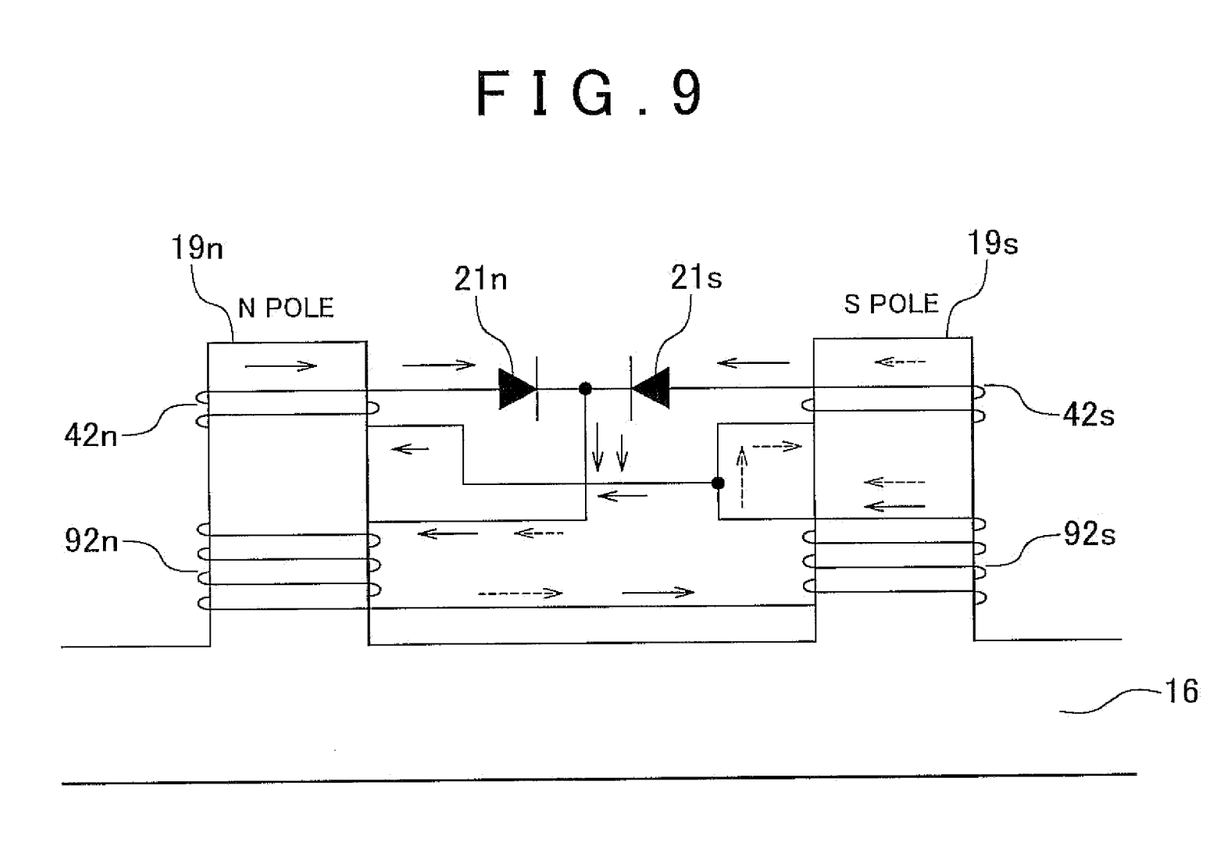
FIG. 9 is a schematic diagram illustrating the way in which current flows in rotor windings in another embodiment of the invention.

FIG. 9 illustrates another configuration example of rotor windings. In this example, the rotor winding 42n is wound on the salient pole (tooth) 19n (shown on the left of the figure), and the rotor winding 42s is wound on the salient pole (tooth) 19s (shown on the right of the figure). The anodes of the diodes 21n, 21s are connected to one ends of the respective rotor windings 42n, 42s, and the cathodes of the diodes 21n, 21s are connected to each other. One end of a common winding 92n that is wound on the base side of the salient pole 19 on which the rotor winding 42n is wound is connected to the connection point of the cathodes of the diodes 21n, 21s, and the other end of the common winding 92n is connected to one end of a common winding 92s that is wound on the base side of the salient pole 19 on which the rotor winding 42s is wound. The other end of the common winding 92s is connected, in common, to the other ends of the rotor windings 42n, 42s.

In the configuration, in the rotor winding 42n there flows only current in a direction regulated by the diode 21n, so that the salient pole 19n on which the rotor winding 42n is wound becomes excited to the N pole by that current; and in the rotor winding 42s, there flows only current in a direction regulated by the diode 21s, so that the salient pole 19s on which the rotor winding 42s is wound becomes excited to the S pole by that current. The common windings 92n, 92s are connected in series. Therefore, the currents flowing from the cathodes of the diodes 21n, 21s flow sequentially through the common windings 92n, 92s. By virtue of these currents, the common winding 92n excites, to the N pole, the salient pole 19n on which the common winding 92n is wound, and the common winding 92s excites, to the S pole, the salient pole 19s on which the common winding 92s is wound.

When induction current flows in the rotor winding 42n, that current flows in the common windings 92n, 92s via the diode 21n. The salient pole 19n is excited to the N pole by the current flowing in the common winding 92n, and the salient pole 19s is excited to the S pole by the current flowing in the common winding 92s.

Figure 10:
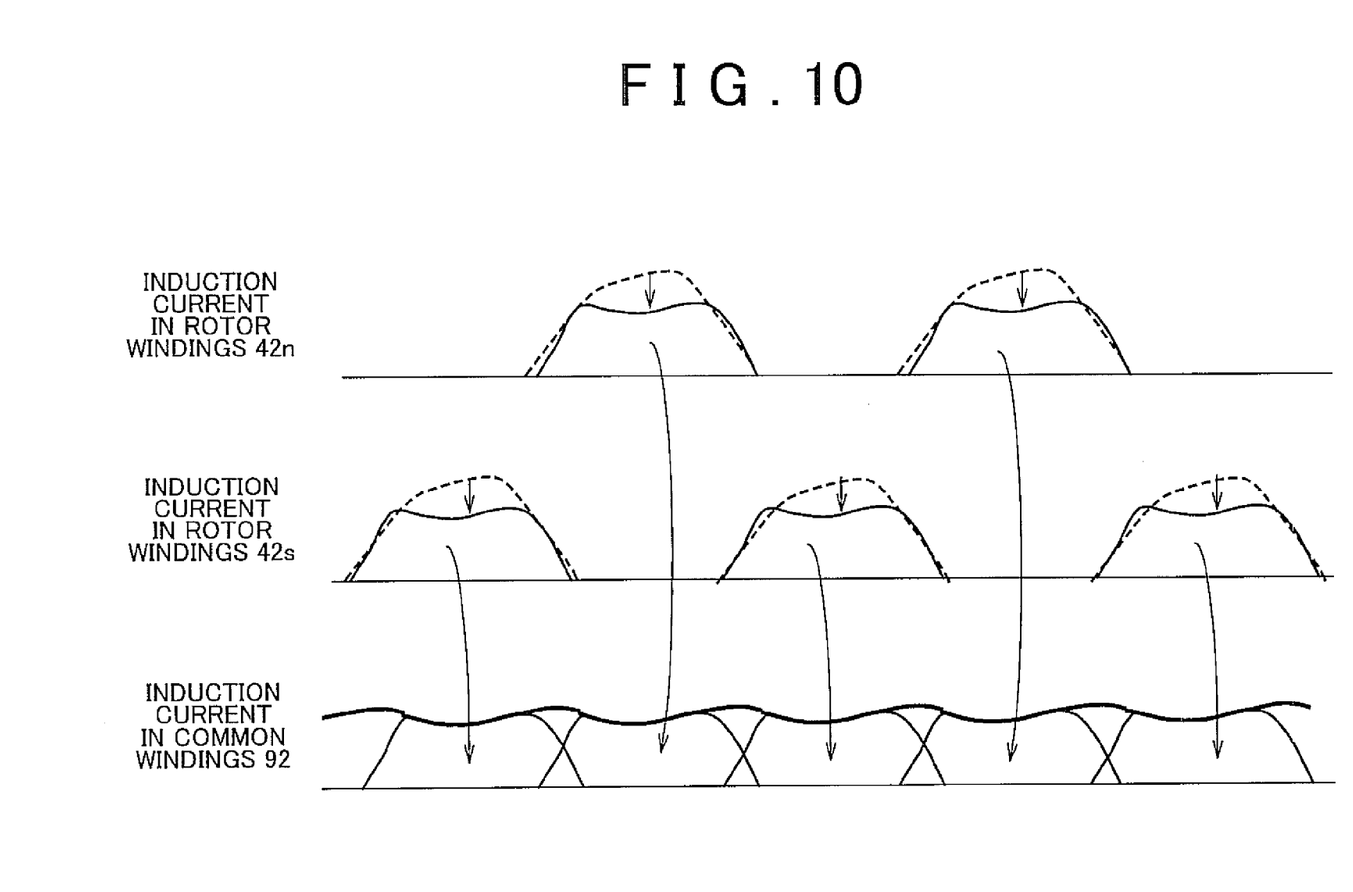
FIG. 10 is a schematic diagram illustrating the way in which current flows in rotor windings and common windings in another embodiment of the invention.

As illustrated in FIG. 10, specifically, induction current flows in the rotor windings 42n and the common windings 92n, 92s at a timing at which the salient poles 19n are excited to the N poles by the rotating magnetic field that is generated by the stator windings. Induction current flows in the rotor windings 42s and the common windings 92n, 92s at a timing at which the salient poles 19s are excited to the S poles by the rotating magnetic field that is generated by the stator windings. Therefore, the salient poles 19n, 19s are excited to the N poles and S poles, respectively, by induction current, at the respective timings. The number of turns in the windings can be increased, and induction current can be reduced, at either the timing at which induction current flows in the rotor windings 42n or the timing at which current flows in the rotor windings 42s. This allows reducing copper loss in windings on the rotor side.

For instance, the number of windings in the rotor windings 42n, 42s is 60 turns in a case where no common windings 92n, 92s are used. In this example, the number of windings in the rotor windings 42n, 42s is set to 20 turns each, and the number of windings in the common windings 92n, 92s is set to 40 turns each. In the example, thus, induction current flows at 100-turn windings at all times. The current flowing in the rotor windings 42n, 42s can be reduced by about 40% in this case.

So long as the salient poles 19n are excited to the N poles, and the salient poles 19s are excited to the S poles, the diodes 21n, 21s, the winding directions of the rotor windings 42n, 42s and the winding directions of the common windings 92n, 92s may be configured arbitrarily.

Preferred embodiments have been explained above, but the invention is not limited to these embodiments, and may be embodied in other ways.

What is claimed is:

1. A rotating electrical machine system, comprising:
a stator that has stator windings of a plurality of phases, and that generates a stator magnetomotive force in accordance with stator current of different phases, which is supplied to the stator windings of the plurality of phases;
a rotor on which rotor windings are wound such that rotor current is generated in accordance with the stator magnetomotive force generated by the stator and a magnetic pole is formed by the rotor current; and
a control unit that controls an output torque from the rotor, by controlling the stator current, wherein in a case where a predetermined torque is output from the rotor, the control unit increases the stator current and reduces a ratio of the rotor current to the stator current through superposition of a pulse onto the stator current so that the rotor current is reduced while the output torque is maintained at the predetermined torque, when a temperature of the rotor is high as compared with when the temperature of the rotor is low, and the control unit reduces the stator current and increases the ratio of the rotor current to the stator current through superposition of a pulse onto the stator current so that the stator current is reduced while the output torque is maintained at the predetermined torque, when a temperature of the stator is high as compared with when the temperature of the stator is low.

* * * * *